Patented Oct. 5, 1943

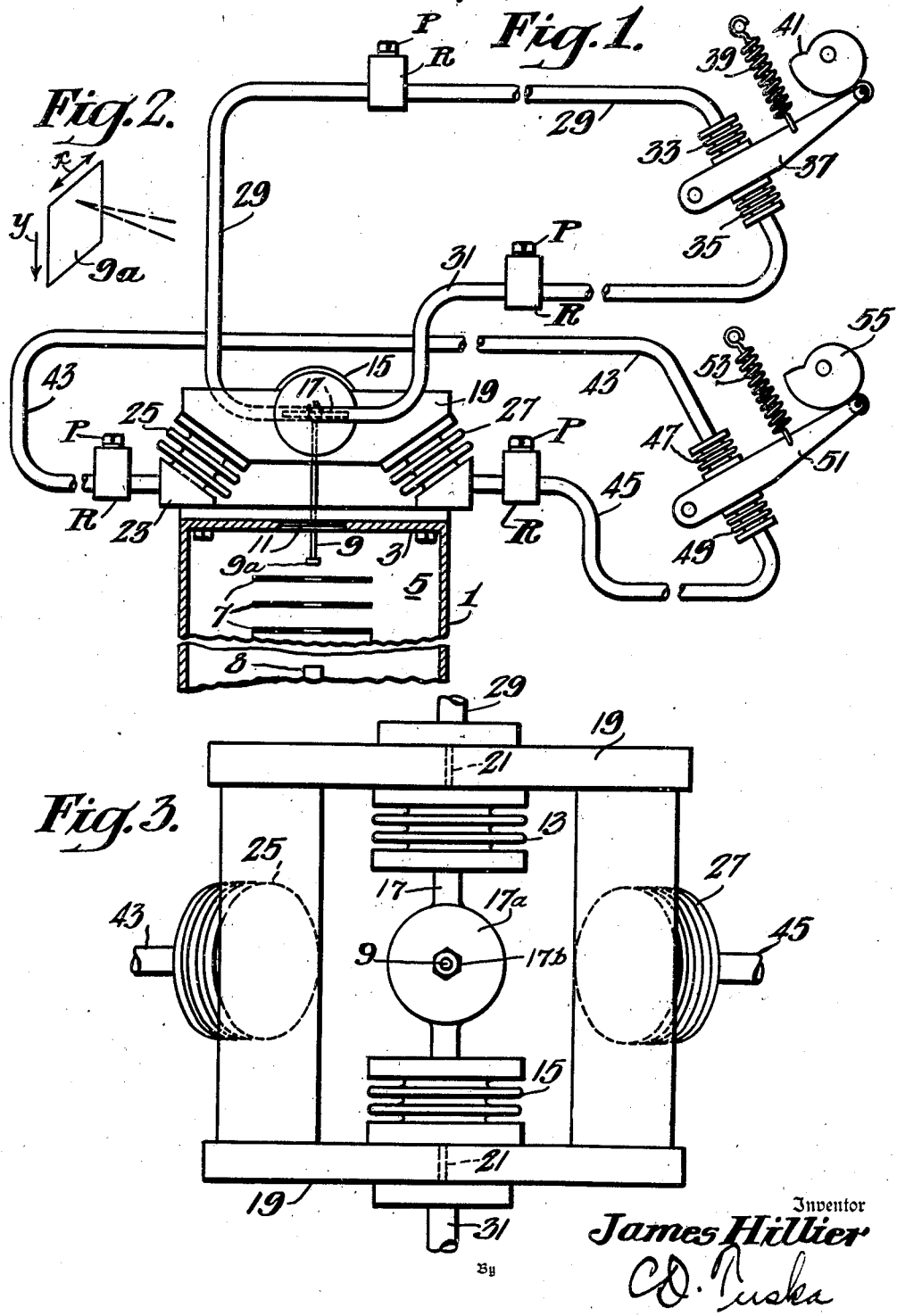

2,330,888

UNITED STATES PATENT OFFICE 2,330,888

SCANNING MICROSCOPE

James Hillier, Collingswood, N. J., assignor to Radio Corporation of America, a corporation of Delaware Application May 29, 1942, Serial No. 445,009

4 Claims. (Cl. 250—49.5)

This invention relates to electron microscopes of the type wherein the specimen or object to be examined is explored or "scanned" by moving the specimen holder in the path of an undeviating electron beam, and has for its principal object the provision of improved means for imparting the requisite line and frame scanning movements to the specimen holder.

The prior art as to electron microscopes of the scanning type is well exemplified in copending application Serial No. 391,188, filed April 30, 1941, by Richard L. Snyder, Jr., and assigned to the same assignee as the instant application. In Snyder's disclosure two dynamic-type loudspeaker motors are employed for imparting the requisite scanning movement to the object holder; one motor serving to provide the line-scanning movement, and the other, the frame-scanning movement. The said motors are driven by amplifiers controlled by phototubes which are actuated by the light from two lamps controlled by rotating spiral cams mechanically coupled to the line and frame scanning mechanism of a facsimile recorder.

It is an object of the present invention to provide an improved line and frame scanning mechanism which dispenses with the auxiliary amplifiers, phototubes and lamps of the prior art.

Another and related object of the present invention is to provide an improved scanning mechanism characterized by its absence of "back-lash" and one which is substantially immune to shocks and tremors of external origin.

The foregoing and other objects are achieved in accordance with the invention by the provision of a "push-pull" hydraulic system incorporating means for converting a motion of relatively large displacement into a motion of extremely small displacement. Certain preferred details of construction together with other objects and advantages will be apparent and the invention itself will be best understood by reference to the following specification and to the accompanying drawing; wherein:

Figure 1 is an elevational view of an embodiment of the hydraulic system of the invention, for imparting relatively minute line and frame scanning movements to the object holder of an electron microscope;

Figure 2 is a graph showing the relative direction of the line and frame scanning movements imparted to the object holder and, Figure 3 is a top plan view of the microscope of Fig. 1 showing a portion of the hydraulic drive system.

In the accompanying drawing, 1 designates the cylindrical side wall and 3 an end wall of an evacuable microscope chamber 5 which, in the instant case, has a long vertical axis and contains an apertured electron lens system 7 through which electrons from an "electron gun" 8 or other source, pass upwardly in an undeviating beam to impinge the lower end 9a of a rod-like element 9 upon which the object or specimen to be examined is mounted. As shown in Fig. 1, the central portion of the end wall of the chamber 5 comprises a thin metal diaphragm 11 which serves as a flexible support for the rod-like specimen holder 9.

As indicated in Fig. 2 the scanning movement necessary to a complete examination of every part of the specimen is provided by moving the specimen holder 9 to and fro across the path of the beam, as shown by the double ended arrow $x$, while at the same time moving the said holder comparatively slowly in the "frame scanning" or transverse direction indicated by the arrow $y$.

In accordance with the present invention, two hydraulically actuated expansible-contractible members which may comprise pistons, or metal bellows 13 and 15 mounted on opposite sides of the rod 9 and connected thereto through a suitable mechanical coupling 17, serve to impart the previously described reciprocating or line scanning movement to the said object holder 9. As more clearly shown in Fig. 3, this mechanical coupling may comprise simply a rod like member 17 which is fixed at its opposite ends to the bellows 13 and 15, respectively, and having an enlarged central portion 17a to which the outer end of the specimen holder 9 is attached as by means of a nut 17b. The bellows 13 and 15 are mounted upon a tiltable frame 19 which is supported upon pivots 21 which rest upon a base 23 on the outer surface of the end wall 3 of the chamber 5. Two inwardly inclined pistons or bellows 25 and 27 mounted on the base 23 contact the underside of the frame 23 upon which the bellows 13 and 15 are mounted and serve to apply the frame scanning movement to the object holder 9 by tilting the frame 23 upon its pivots 21 during the line scanning movement.

The bellows 13 and 15 which impart the line scanning movement to the object holder 9 are connected, as shown in Fig. 1, by conduits 29 and 31, respectively, to smaller pistons or bellows 33 and 35 which are actuated by a common cam follower 37 which is biased as by a spring 39 to bear against the periphery of a rotating spiral cam 41. Similarly, the bellows 25 and 27 which supply the frame scanning movement are connected by conduits 43 and 45, respectively, to small pistons or bellows 47 and 49 which are actuated by a common cam follower 51 which is biased by a spring 53 to bear against a cam 55. Each conduit may include a reservoir R which may be provided with a screw controlled plunger P for regulating the pressure of the fluid therein.

It will be observed upon inspection of Fig. 1 that the driving bellows of each pair 33, 35 and 47, 49 and hence the bellows 13, 15 and 25, 27 which they actuate or "drive" are arranged in "push-pull" relation. This is to say the expansion of the driven bellows 15 caused by the application of a compression force to the driving bellows 35 through the cam follower 37 as it follows the rise of cam 41 is accompanied by a corresponding contraction of the bellows 13 resulting from the gradual removal of the compression force upon the driving bellows 33 which is associated therewith. This push-pull arrangement contributes materially to the smoothness and accuracy of the line and frame scanning movements.

Where, as described in the previously identified Snyder application, the electronic output of the microscope serves to actuate a conventional facsimile recorder (not shown) the cams 41 and 55 may be coupled directly to the line and frame scanning mechanism of the recorder and, in any event, will be understood to operate in synchronism with the particular registering device employed. If the recorder is of the conventional carbon paper type, for example (RCA type FAX-2A), the line scanning cam 41 will ordinarily be driven at the rate of seventy-five r. p. m. and the frame scanning cam 55 at the rate of one revolution every ten minutes.

Since the details of the specimen or object to be explored by the beam are exceedingly small, the diameter of the electron beam must be correspondingly small (say 1/50 the wave length of light) if good resolution is to be obtained. To reproduce minute details in the final picture great magnification and good resolution are necessary. Because the physical dimensions of the final picture are necessarily limited by the dimensions of the recorder, the line and frame scanning movements of the object holder must be correspondingly limited. By way of example, in one set-up wherein the final picture was 8" by 6" at a magnification of 15,000 diameters the displacement of the object holder in the line scanning direction was 0.00053" and in the frame scanning direction was 0.00040". In the illustrated embodiment of the invention such small movements are achieved in three stages: (1) by employing levers of the second class as cam followers, (2) by employing smaller driving than driven pistons and (3) by employing a lever of the first class as the object holder.

Various modifications of the above described line and frame scanning mechanism will suggest themselves to those skilled in the art to which this invention appertains. Accordingly, it is to be understood that the foregoing is to be interpreted as illustrative and not in a limiting sense except as required by the prior art and by the spirit of the appended claims.

I claim as my invention:

1. A scanning type electron microscope comprising means for forming an undeviating electron beam, an object holder mounted for movement in the path of said beam, and hydraulic means for moving said object holder in the line and frame-scanning directions with respect to said beam.

2. A scanning type electron microscope comprising means for forming an undeviating electron beam, an object holder mounted for movement in the path of said beam, a tiltable base upon which said object holder is supported, hydraulic means on said base for imparting a reciprocating line-scanning movement to said object holder, and separate hydraulic means for tilting said base whereby to impart a frame-scanning movement to said object holder.

3. The invention as set forth in claim 2 and wherein said separate hydraulic means for tilting said base comprises a pair of pressure responsive expansible-contractible members connected in push-pull driving relation and mounted on opposite sides of said base.

4. A scanning type electron microscope comprising means for forming an undeviating electron beam, an object holder mounted for movement in the path of said beam, a pair of pressure responsive expansible-contractible members mounted on opposite sides of said object holder and coupled in driving relation therewith, and hydraulic means for concomitantly inversely varying the pressure applied to said expansible-contractible members whereby to impart a reciprocating line-scanning movement to said object holder.

JAMES HILLIER.